United States Patent
Olsen et al.

(10) Patent No.: US 6,822,193 B2
(45) Date of Patent: Nov. 23, 2004

(54) METHOD OF MAKING SOLID OXIDE FUEL CELLS AND STACKS

(75) Inventors: Christian Olsen, Ballerup (DK); Jens Christiansen, Hørsholm (DK)

(73) Assignee: Haldor Topsoe A/S, Lyngby (DK)

( * ) Notice: Subject to any disclaimer, the term of this patent is extended or adjusted under 35 U.S.C. 154(b) by 22 days.

(21) Appl. No.: 10/435,058

(22) Filed: May 12, 2003

(65) Prior Publication Data

US 2004/0017028 A1 Jan. 29, 2004

(30) Foreign Application Priority Data

May 14, 2002 (DK) ........................................ 2002 00732

(51) Int. Cl.[7] ............................ C04B 35/64; B26D 7/06
(52) U.S. Cl. ....................... 219/121.72; 264/618; 83/29
(58) Field of Search ........................ 219/121.6, 121.67, 219/121.68, 121.69, 121.72, 121.85; 264/618; 83/29

(56) References Cited

U.S. PATENT DOCUMENTS

| | | | |
|---|---|---|---|
| 4,913,982 A | | 4/1990 | Kotchick et al. |
| 5,077,148 A | * | 12/1991 | Schora et al. ................. 429/16 |
| 5,256,499 A | * | 10/1993 | Minh et al. .................... 429/33 |
| 5,279,909 A | | 1/1994 | Horner et al. |
| 6,218,037 B1 | | 4/2001 | Greiner et al. |

FOREIGN PATENT DOCUMENTS

| DE | 40 41 496 A1 | 6/1992 |
|---|---|---|
| DE | 41 19 910 C1 | 12/1992 |

OTHER PUBLICATIONS

Himeko Orui et al., "Electrochemical Characteristics of Tubular Flat–Plate SOFCs Fabricated by Co–firing Cathode Substrate and Electrolyte", *Journal of Power Sources*, vol. 112, No. 1, pp. 90–97 (2002).

Himeko Orui et al., "Performance of a Solid Oxide Fuel Cell Fabricated by Co–Firing", Journal of Power Sources, vol. 71, No. 1–2, pp. 185–189 (1998).

F. Tietz, et al., "Components Manufacturing For Solid Oxide Fuel Cells", *Solid State Ionics*, vol. 152–153, pp. 373–381 (2002).

P. Holtappels, et al., "Fabrication and Performance of Advanced Multi–layer SOFC Cathodes", Journal of European Ceramic Society, vol. 22, No. 1, pp 41–48 (2002).

* cited by examiner

*Primary Examiner*—Samuel M. Heinrich
(74) *Attorney, Agent, or Firm*—Dickstein Shapiro Morin & Oshinksy LLP

(57) ABSTRACT

The invention concerns a method for making Solid Oxide Fuel Cells (SOFC) and stacks. The method concerns assembling the layers required for the formation of a fuel cell, sintering the fuel cell and thereafter shaping the cell. When making a fuel cell stack, the sintered fuel cells are assembled with the interconnect, spacing and sealing material to form a stack of at least one stack element, followed by shaping the stack. Shaping is carried out in various ways and maximum tolerances of 1% are obtained.

10 Claims, 1 Drawing Sheet

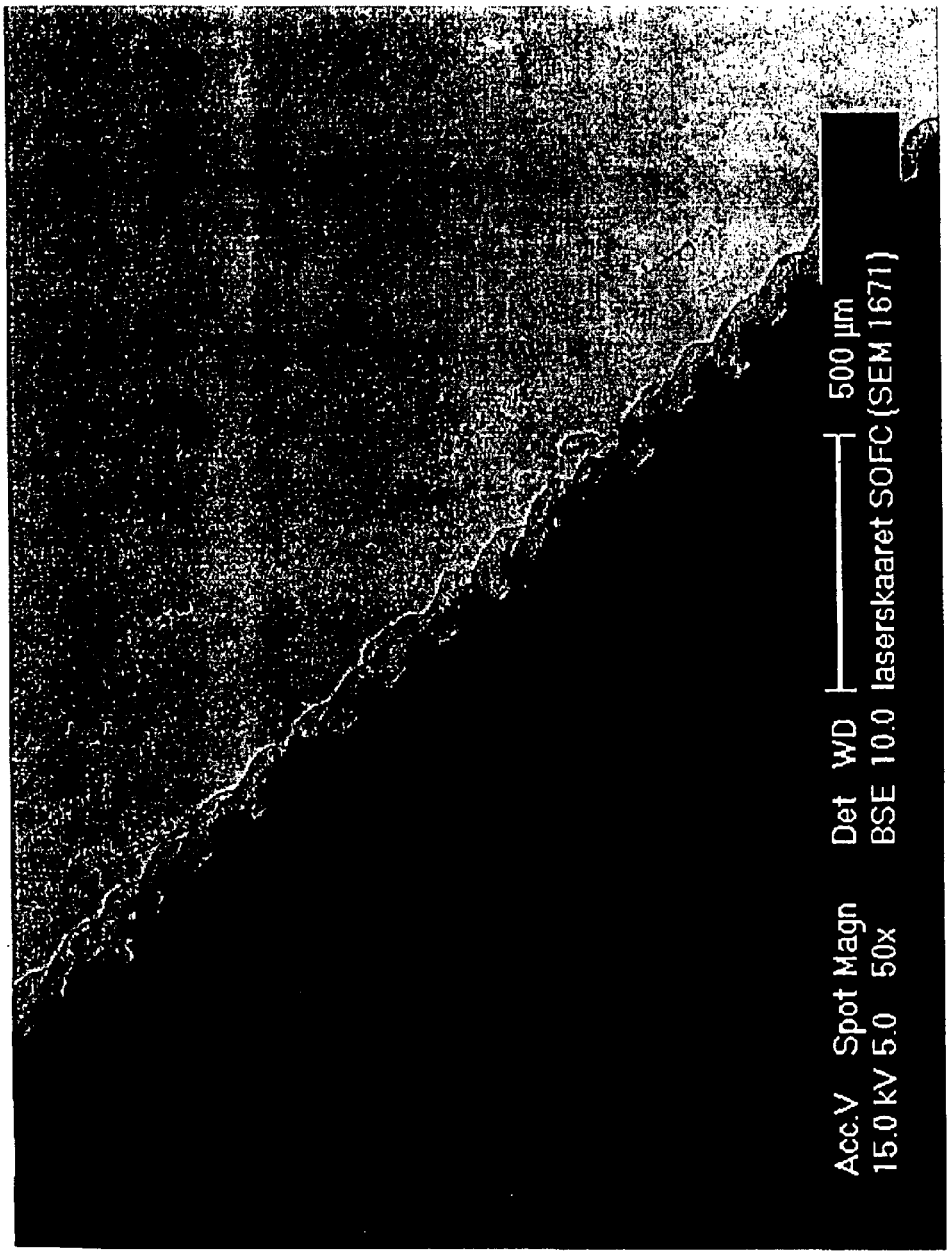

METHOD OF MAKING SOLID OXIDE FUEL CELLS AND STACKS

The invention concerns a method of making solid oxide fuel cells (SOFC) and SOFC stacks. More particularly, the invention concerns shaping SOFC cells and SOFC stacks.

A SOFC stack consists of a number of different components belonging to both the metallic materials, the ceramic materials and glasses. A typical solid oxide fuel cell consists of a number of different components including anode, electrolyte and cathode, and a fuel cell stack element includes support material, contact layers, interconnect, spacing and sealing material. Each component is prepared by a unique process route. Some of the materials have mechanical properties that make them easy to machine, whereas other materials are brittle and thus easily break when they are machined.

The ceramic components are typically pre-shaped individually before they are sintered. This is maily due to the hardness and the brittleness of these materials after sintering. The ceramic material shrinks during the sintering and thus the final shape can only be predicted within a few percent. When the components must fit into a chamber or to manifolds, the tolerance must be lower.

U.S. Pat. No. 4,913,982, incorporated herein by reference, describes a method for making a solid oxide ceramic fuel cell whereby the individual components of the fuel cell are stacked before cutting and sintering. Four tape layers consisting of cathode, electrolyte, anode and interconnect are assembled together to form a multilayer tape. A portion of the multilayer tape is then cut into the desired shape, processed to form internal passageways and then sintered to form a fuel cell. This method, however, still leads to problems with the final dimensions of the fuel cell since the sintering process is carried out after cutting and shaping the fuel cell.

In order to solve the above problem, we have found that it is possible to achieve a low tolerance of the final fuel cell by building up the layers consisting of support, anode electrolyte and cathode on top of each other and sintering the fuel cell. A number of sintered fuel cells together with intermediate components consisting of interconnect, spacing and sealing material, i.e. a number of fuel cell stack elements, can also be stacked to form a SOFC stack. The single fuel cell, a number of fuel cells, a stack element or the whole stack are thereafter shaped at the same time.

It is an objective of the invention to provide a simple and inexpensive method of making SOFC cells or stacks consisting of a number of different components of different materials, the cell or stack having a narrow tolerance of all the components in the stack.

This objective is achieved by a method of making one or more solid oxide fuel cells comprising the subsequent steps of:

assembling layers of support, anode, electrolyte and cathode to form at least one fuel cell, sintering the at least one fuel cell, shaping the at least one fuel cell to the desired dimensions to obtain a cell with a maximum tolerance of 1%.

This objective is also achieved by a method of making a solid oxide fuel cell stack comprising the subsequent steps of:

assembling layers of sintered solid oxide fuel cells, interconnect, spacing and sealing material to form a fuel cell stack of at least stack element, shaping the assembled fuel cell stack to the desired dimensions to obtain a stack with a maximum tolerance of 1%.

The shaping is carried out by machining, for instance, the sintered fuel cell using a cutting wheel or other cutting tools.

The method of the invention can also be carried out by stacking the components including the sintered fuel cell and then machining them in one goal using a cutting wheel or other cutting tools. The number of components stacked is dependent on the required number of fuel cells. The components for, for instance 5000 fuel cells, can be stacked in the correct order and then cut in the required dimensions to fit the manifold or chamber they are to be placed in.

In this way it is possible to obtain a narrow tolerance of a solid oxide fuel cell, a fuel cell stack element or a fuel cell stack. The method is simple and inexpensive and allows the fabrication of many fuel cells or fuel cell stack elements in one cutting step.

A typical ceramic fuel cell can have a thickness of 0.3 mm. It is, therefore, expected that the cell is very sensitive to mechanical stress such as the stress experienced during the cutting process, which in turn can lead to cracks and destruction of the cell.

When sintering the cell, the components can shrink to values of approximately 20% of their original dimensions. It is difficult to predict the extent of shrinkage and a narrow tolerance is therefore desirable. By cutting the stack after sintering, tolerances of 0.1% are obtained.

Various cutting tools can be used to shape the SOFC cell and the SOFC stack to obtain the desirable outer dimensions. Examples are a diamond coated cutting string, a laser and a water nozzle cutting tool.

When using a cutting tool consisting of a water nozzle cutting tool, an abrasive can be added to facilitate the cutting process.

A low tolerance can also be achieved by shaping the SOFC cell or the SOFC stack by grinding and polishing the periphery of the single cell or the stack.

EXAMPLES

Example 1

One sintered fuel cell consisting of assembled layers of support, anode, electrolyte and cathode is cut using a laser in order to achieve the desired outer dimensions.

A section of the resulting cell is illustrated in the figure. Scanning electron microscopy shows that a neat, well-defined cell border is obtained after cutting. The absence of cracks throughout the cell and at the border indicates that the cell, despite its thinness, is not destroyed by the cutting process.

Example 2

The parts of a SOFC stack element consisting of a sintered fuel cell assembled with layers of support, anode, electrolyte and cathode, together with interconnect, spacing and sealing material are placed in the proper order. The stack element is shaped by cutting using a laser.

The resulting shaped SOFC stack did not show any cracks and remained intact as observed with the SOFC cell of Example 1.

Example 3

An SOFC stack consisting of several stack elements are shaped by cutting with a laser.

The resulting shaped SOFC stack did not show any cracks and remained intact as observed with the previous examples.

Maximum tolerances of 1% were obtained in all cases.

What is claimed is:

1. A method of making one or more Solid Oxide Fuel Cells comprising the subsequent steps of:

assembling layers of support, anode, electrolyte and cathode to form at least one solid oxide fuel cell, sintering the at least one fuel cell, shaping the at least one fuel cell to the desired dimensions to obtain a cell with a maximum tolerance of 1%.

2. The method of claim 1, wherein multiple layers of support, anode, electrolyte and cathode are stacked to form multiple layers of fuel cells.

3. The method of claim 2, wherein multiple layers of fuel cells are shaped.

4. The method of claim 1, wherein the sintered fuel cell is shaped by cutting with a laser.

5. The method of claim 1, wherein the sintered fuel cell is shaped by cutting with a diamond coated cutting string, a water nozzle cutting tool or a cutting wheel.

6. The method of claim 1, wherein the sintered fuel cell is shaped by grinding and polishing.

7. A method of making a solid oxide fuel cell stack comprising the subsequent steps of:

assembling layers of sintered solid oxide fuel cells, interconnect, spacing and sealing material to form a fuel cell stack of at least one stack element, shaping the assembled fuel cell stack to the desired dimensions to obtain a stack with a maximum tolerance of 1%.

8. The method of claim 6, wherein the assembled layers of the fuel cell stack consist of 2–5000 fuel cell stack elements.

9. The method of claim 6, wherein the assembled fuel cell stack is shaped by cutting with a diamond coated cutting string, a laser, a water nozzle cutting tool or a cutting wheel.

10. The method of claim 6, wherein the assembled fuel cell stack is shaped by grinding and polishing.

* * * * *